United States Patent
Hakoda et al.

(10) Patent No.: US 8,097,193 B2
(45) Date of Patent: Jan. 17, 2012

(54) METHOD OF ADJUSTING MOLD THICKNESS OF TOGGLE-TYPE MOLD CLAMPING DEVICE

(75) Inventors: Takashi Hakoda, Nagano-Ken (JP);
Isamu Yamaguchi, Nagano-Ken (JP);
Takemi Uehara, Nagano-Ken (JP);
Susumu Morozumi, Nagano-Ken (JP)

(73) Assignee: Nissei Plastic Industrial Co., Ltd, Nagano-Ken (JP)

( * ) Notice: Subject to any disclaimer, the term of this patent is extended or adjusted under 35 U.S.C. 154(b) by 0 days.

(21) Appl. No.: 12/832,273

(22) Filed: Jul. 8, 2010

(65) Prior Publication Data
US 2011/0018157 A1    Jan. 27, 2011

(30) Foreign Application Priority Data
Jul. 23, 2009    (JP) .................. 2009-171919

(51) Int. Cl.
*B29C 45/80*    (2006.01)
(52) U.S. Cl. ........................ 264/40.5; 425/150
(58) Field of Classification Search ............... 264/40.1, 264/40.5, 328.1; 700/200, 203; 425/150
See application file for complete search history.

(56) References Cited

U.S. PATENT DOCUMENTS

| | | | | |
|---|---|---|---|---|
| 5,045,253 A | * | 9/1991 | Kamiguchi et al. | 264/40.5 |
| 5,059,365 A | * | 10/1991 | Hertzer et al. | 264/40.5 |
| 5,279,778 A | * | 1/1994 | Taira et al. | 264/40.1 |
| 6,402,998 B1 | * | 6/2002 | Onishi | 264/40.5 |
| 6,419,861 B1 | * | 7/2002 | Stirn et al. | 264/40.5 |
| 2006/0197248 A1 | * | 9/2006 | Kato et al. | 264/40.5 |

FOREIGN PATENT DOCUMENTS
JP    2007-98832 A    4/2007
* cited by examiner

*Primary Examiner* — Jill Heitbrink
(74) *Attorney, Agent, or Firm* — Knoble Yoshida & Dunleavy, LLC

(57) ABSTRACT

There are provided a first process T1 in which a mold clamping motor 4 is driven-controlled so as to move a cross head 5h of a toggle link mechanism 5 to a preliminary position Xr set in advance so as to become a position on the mold open side rather than a mold closure position Xs; a second process T2 in which after the first process T1 is finished, a mold thickness adjusting motor 2 is driven-controlled so as to move a pressure receiving platen 3 forward to a mold closed position Xc where a mold C is closed; a third process T3 in which after the second process T2 is finished, the mold clamping motor 4 is driven-controlled so as to move the cross head 5h forward, while the mold C is pressurized by torque limitation of the mold clamping motor 4, and the mold thickness adjusting motor 2 is driven-controlled so as to move the pressure receiving platen 3, while the cross head 5h is moved to the mold closure position Xs; and a fourth process T4 in which, after the third process T3 is finished, a clamping margin Lp of the mold C corresponding to a predetermined mold clamping force is set.

19 Claims, 6 Drawing Sheets

METHOD OF ADJUSTING MOLD THICKNESS OF TOGGLE-TYPE MOLD CLAMPING DEVICE

TECHNICAL FIELD

The present invention relates to a method of adjusting a mold thickness of a toggle-type mold clamping device which is suitably used in mold thickness adjustment by moving a pressure receiving platen to a predetermined position through driving control of a mold thickness adjusting motor.

BACKGROUND ART

A toggle-type mold clamping device for clamping a mold provided in an injection molding machine in general has a function of connecting a movable platen supporting a movable mold and a cross head moving forward and backward by a driving portion supported by a pressure receiving platen by a toggle link mechanism and of increasing a pressurizing force of the cross head and transmitting it to the movable platen, and a predetermined mold clamping force is generated based on expansion of a tie bar in a state in which the toggle link mechanism has been expanded substantially to the full. Therefore, it is necessary to set a position of the pressure receiving platen so that a predetermined mold clamping force is generated, and the position of the pressure receiving platen is automatically set in usual by a mold thickness adjusting device.

As a prior-art method of adjusting a mold thickness using this type of mold thickness adjusting devices, a method of adjusting a mold thickness in an injection molding machine already proposed by the applicant and disclosed in Patent Document 1 is known. This method of adjusting a mold thickness includes, in mold thickness adjustment by moving the pressure receiving platen to a predetermined position, a first process in which in a state in which the toggle link mechanism is expanded, the pressure receiving platen is moved forward from a retreated position at a first speed, which is a high speed, and when the pressure receiving platen has reached a mold closure position, the platen is moved backward only by a predetermined distance, a second process in which after the first process, the pressure receiving platen is moved forward at a second speed, which is a low speed, and when the pressure receiving platen has reached the mold closure position, the toggle link mechanism is bent and the mold is opened only by a predetermined distance and after that, the pressure receiving platen is moved forward only by a distance corresponding to a clamping margin to obtain a targeted clamping force, and a third process in which after the second process, the pressure receiving platen is moved backward only by a predetermined distance (correction distance) so as to make correction, and the method had advantages that the number of work processes can be reduced, production efficiency can be improved, and sufficient accuracy and stability can be ensured.

SUMMARY OF INVENTION

Technical Problem

However, the prior-art mold thickness adjusting methods in a toggle-type mold clamping device including the mold thickness adjusting method disclosed in the above-mentioned Patent Document 1 also have the following problems to be solved.

First, since the mold thickness adjusting motor can accomplish its function only if it can move the pressure receiving platen to a predetermined position at a low speed, a relatively small-sized motor with a small power is usually used in many cases, considering a cost aspect and space saving performances. Therefore, in the case of a special mold in which a spring is interposed between a fixed mold and a movable mold or in the case of a mold in which a machine error in mounting can be easily generated and parallelism between the fixed mold and the movable mold cannot be ensured easily due to the mold structure, for example, there can be a problem unique to the small-sized mold thickness adjusting motor such that a normal mold closure position is not reached when the mold is closed, which results in a risk of an error factor in mold thickness adjustment. Moreover, since this problem becomes the more serious, as the mold thickness adjusting motor becomes smaller, there has been a limit in size reduction, energy saving and cost cut of the mold thickness adjusting motor.

Secondly, in the mold thickness adjusting motor, accurate position control by servo control or the like is not performed within a process of a molding process, but the motor functions as a motor for adjustment to be used temporarily, the position control in setting of a clamping margin, for example, is executed by open-loop control in many cases. Therefore, if a mold with a large weight is attached, for example, inertia is increased during adjustment (movement), and there is a fear that accuracy of an adjusted position is not ensured. In the end, this can cause trouble that can not be ignored if a high quality or accuracy is demanded in a molded product.

Solution to Problem

The present invention was made in order to solve the above problems and is a method of adjusting a mold thickness of a toggle-type mold clamping device for mold thickness adjustment by moving a pressure receiving platen to a predetermined position by a driving control of a mold thickness adjusting motor, including a first process in which a mold clamping motor is driven-controlled so as to move a cross head of a toggle link mechanism is moved to a preliminary position set in advance to become a position on a mold open side rather than a mold closure position, a second process in which after completion of the first process, the mold thickness adjusting motor is driven-controlled so as to move a pressure receiving platen forward to the mold closure position where the mold is closed, a third process in which after completion of the second process, the mold clamping motor is driven-controlled so as to move the cross head forward, torque limitation of the mold clamping motor is performed so as to pressurize the mold and the mold thickness adjusting motor is driven-controlled so as to move the pressure receiving platen in a forward direction or a backward direction, while the cross head is moved based upon a measured position of said cross head in relation to the mold closure position, and a fourth process in which after completion of the third process, a mold clamping margin corresponding to a predetermined mold clamping force is set.

Also, the present invention can use a geared motor incorporating a reduction gear mechanism for a mold thickness adjusting motor in a preferable mode. The position of the pressure receiving platen moved by driving of the mold thickness adjusting motor can be position-controlled by open-loop control. Moreover, a speed at which the pressure receiving platen is moved backward can be set at a speed higher than the speed at which the pressure receiving platen is moved forward. On one hand, in the first process, when movement to the preliminary position cannot be made even by the driving control of the mold clamping motor, the pressure receiving platen can be moved by the mold thickness adjusting motor. Also, in the third process, the torque limitation of the mold clamping motor can be performed at 3 to 20[%] of that in high-pressure mold clamping. On the other hand, in the fourth process, after completion of the third process, the movable platen is moved backward only by a predetermined distance by driving control of the mold clamping motor, and then, the pressure receiving platen can be moved forward only by a clamping margin set in advance through driving control of the mold thickness adjusting motor. Moreover, in the fourth embodiment, the position of the pressure receiving platen is detected by a rotary encoder attached to the mold thickness adjusting motor, and the pressure receiving platen can be moved forward or moved backward by driving control of the mold thickness adjusting motor until the position of the pressure receiving platen reaches a clamping-margin set position corresponding to the clamping margin. Also, when the pressure receiving platen is moved forward or moved backward by driving control of the mold thickness adjusting motor, the mold clamping motor can be driven-controlled at the same time so as to move the movable mold backward or forward in a mold so that relative positions of the movable mold and the fixed mold in a mold can be controlled constant. The clamping-margin set position corresponding to the clamping margin is preferably set by a predetermined allowable range.

Advantageous Effects of Invention

A method of adjusting a mold thickness of a mold in a toggle-type mold clamping device, including the steps: a) adjusting a position of a cross head to a first predetermined position using a mold clamping motor; b) adjusting a position of a pressure receiving platen to a second predetermined position using a mold thickness adjusting motor; c) further forwarding said cross head by said mold clamping motor at a predetermined limited torque so that said mold is pressurized after said steps a) and b); d) measuring a position of said cross head after said step c); and e) adjusting the measured position of said cross head using a combination of said mold thickness adjusting motor and said clamping motor until the measured position of said cross head is at a predetermined mold closure position.

According to the method of adjusting a mold thickness of a toggle-type mold clamping device according to the present invention using the above method, the following remarkable effects are exerted.

(1) Since a driving force of a mold clamping system including a mold clamping motor and a toggle link mechanism is used in order to close a mold in performing mold thickness adjustment, even if a relatively small-sized motor with a small power is used for the mold thickness adjusting motor, an error factor in the mold thickness adjustment caused by a special mold in which a spring is interposed between a fixed mold and a movable mold or a mold in which a machine error in mounting can easily occur due to a mold structure and parallelism between the fixed mold and the movable mold cannot be easily ensured, for example, can be eliminated. As a result, the mold thickness adjustment with high accuracy can be performed for molds in various structures including special molds and molds in various states.

(2) Since the error factor in the mold thickness adjustment is eliminated by performing mold closure using the driving force of the mold clamping system, as a result, further size reduction, energy saving, and cost cut can be realized in the mold thickness adjusting motor. Particularly, by using a geared motor incorporating a reduction gear mechanism for the mold thickness adjusting motor in a preferable mode, greater performances can be obtained from the viewpoints of size reduction, energy saving, and cost cut.

(3) By performing position control of a position of the pressure receiving platen moved by driving of the mold thickness adjusting motor by open-loop control in a preferable mode, a control system relating to the mold thickness adjustment including the mold thickness adjusting motor can be simplified, and further contribution can be made to size reduction, energy saving, and cost cut.

(4) By setting the speed at which the pressure receiving platen is moved backward higher than a speed at which the pressure receiving platen is moved forward in a preferable mode, accurate position control at a low speed is made possible during forward movement in the position control and if the platen is moved forward too much, it can be rapidly returned by high-speed backward movement, and the overall time in the position control can be reduced.

(5) By moving the pressure receiving platen by the mold thickness adjusting motor in a preferable mode if movement cannot be made to the preliminary position even by driving control of the mold clamping motor in the first process, movement can be reliably made to the preliminary position, and automation of the mold thickness adjustment can be realized easily and reliably.

(6) By performing the torque limitation of the mold clamping motor at 3 to 20[%] of that in the high-pressure mold clamping in the third process in a preferable mode, useless application of an excessive pressure to the mold can be avoided, and an error factor in the mold thickness adjustment to the special mold in which a spring is interposed between the fixed mold and the movable mold, for example, can be effectively eliminated at the same time.

(7) By moving the movable platen backward only by a predetermined distance through driving control of the mold clamping motor and then, by moving the pressure receiving platen forward only by a clamping margin set in advance through the driving control of the mold thickness adjusting motor in the fourth process in a preferable mode, the clamping margin for generating a predetermined mold clamping force can be set easily and reliably.

(8) By detecting a position of the pressure receiving platen by a rotary encoder attached to the mold thickness adjusting motor and by moving the pressure receiving platen forward or backward through driving control of the mold thickness adjusting motor until the position of the pressure receiving platen reaches the clamping margin set position corresponding to the clamping margin in a preferable mode, even in the position control by open-loop control, position accuracy can be ensured in the case in which a mold with a large weight so as to have large inertia during adjustment (movement) is attached, for example, and contribution can be made to higher quality and accuracy of a molded product.

(9) When the mold thickness adjusting motor is driven-controlled so as to move the pressure receiving platen forward or backward, by performing driving control of the mold clamping motor at the same time so as to move the movable mold in the mold backward or forward so that relative positions of the movable mold and the fixed mode in the mold are controlled constant in a preferable mode, safety can be further improved such that drop of the mold can be prevented or the like.

(10) By setting the clamping margin set position corresponding to the clamping margin by a predetermined allowable range in the fourth process in a preferable mode, rapid movement to the target position can be realized and contribution can be made to time reduction and stability of the mold thickness adjustment.

DESCRIPTION OF EMBODIMENTS

Subsequently, preferred embodiments according to the present invention will be described in detail referring to the attached drawings. The attached drawings do not specify the present invention but are shown only for facilitating understanding of the present invention. Also, in order to avoid vagueness of the present invention, detailed description will be omitted for known portions.

First, a configuration of a toggle-type mold clamping device Mc that can execute the method of adjusting a mold thickness according to this embodiment will be described referring to FIGS. 3 to 5.

Figure 3:
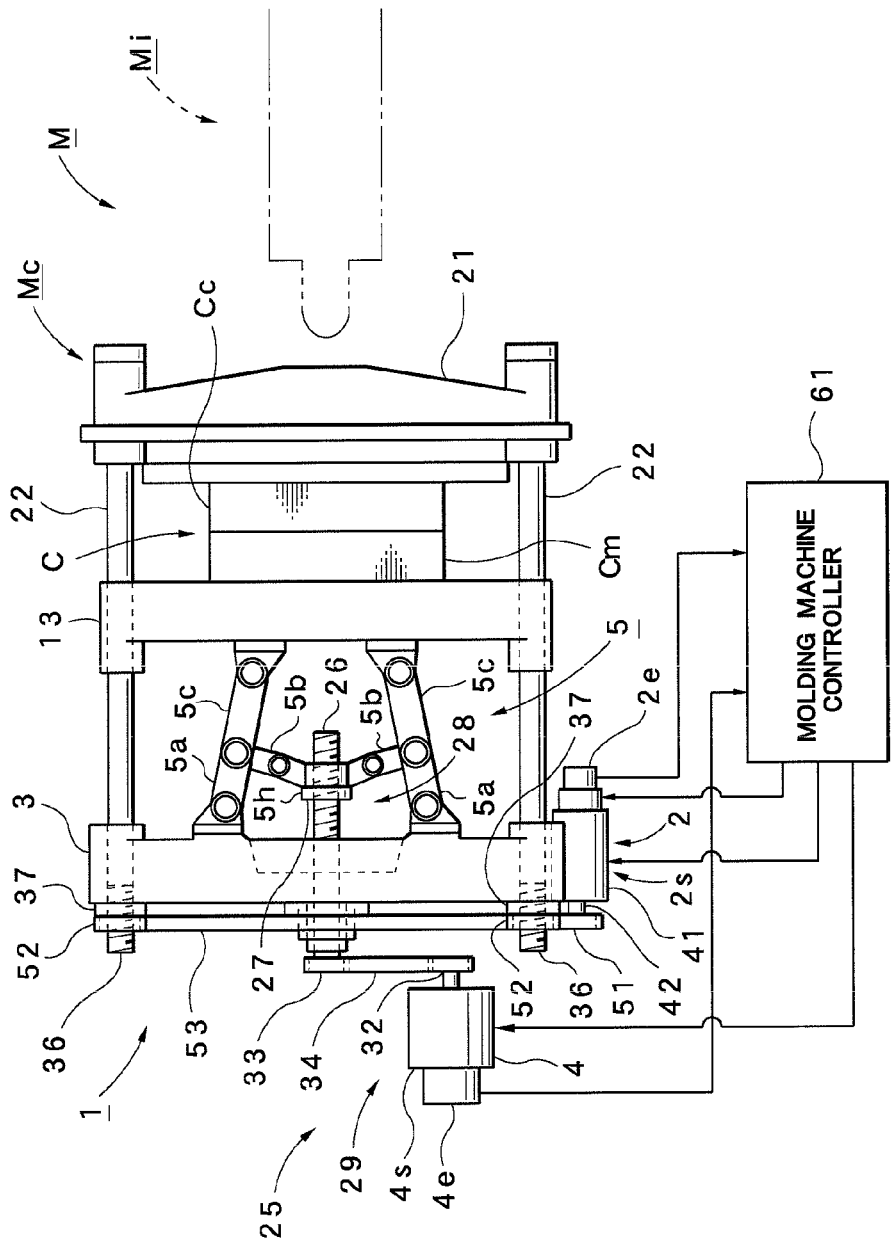
FIG. 3 is a plan view of a toggle-type mold clamping device that can execute the method of adjusting a mold thickness.

In FIG. 3, an injection molding machine indicated by reference character M includes a toggle-type mold clamping device Mc and an injecting device Mi. The toggle-type mold clamping device Mc is provided with a fixed platen 21 and a pressure receiving platen 3 disposed separately, the fixed platen 21 is fixed onto a machine base, not shown, while the pressure receiving platen 3 is supported on the machine base capable of being moved forward/moved backward. Also, between the fixed platen 21 and the pressure receiving platen 3, four tie bars 22, . . . are extended. In this case, a front end of each of the tie bars 22, . . . is fixed to the fixed platen 21, while a rear end of each of the tie bars 22, . . . is inserted through the pressure receiving platen 3.

On the other hand, to the tie bars 22, . . . , the movable platen 13 is slidably attached. The movable platen 13 supports a movable mold Cm, while the fixed platen 21 supports a fixed mold Cc, and the movable mold Cm and the fixed mold Cc constitute a mold C. Moreover, between the pressure receiving platen 3 and the movable platen 13, a toggle link mechanism 5 is disposed. The toggle link mechanism 5 has a pair of first links 5a and 5a pivotally supported by the pressure receiving platen 3, a pair of output links 5c and 5c pivotally supported by the movable platen 13, and a pair of second links 5b and 5b connected to support shafts of the first links 5a and 5a and the output links 5c and 5c, and the second links 5b and 5b are pivotally supported by a cross head 5h.

Also, between the pressure receiving platen 3 and the cross head 5h, a mold-clamping driving portion 25 is disposed. The mold-clamping driving portion 25 includes a ball screw portion 26 rotatably supported by the pressure receiving platen 3, a ball screw mechanism 28 screwed with the ball screw portion 26 and having a ball nut portion 27 integrally disposed on the cross head 5h, and a rotation driving mechanism portion 29 for rotation driving of the ball screw portion 26. The rotation driving mechanism portion 29 includes a mold clamping motor 4 using a servo motor 4s, a rotary encoder 4e that is attached to the mold clamping motor 4 and detects a rotation number of the mold clamping motor 4, a driving gear 32 attached to a shaft of the mold clamping motor 4, a driven gear 33 attached to the ball screw portion 26, and a timing belt 34 expanded between the driving gear 32 and the driven gear 33. In this case, an incremental encoder may be used as the rotary encoder 4e so that an absolute position can be detected by an occurrence number of encoder pulses at a reference position. An absolute type that detects an absolute position may be used as the rotary encoder 4e.

As a result, by operating the mold clamping motor 4, the driving gear 32 is rotated, the rotation of the driving gear 32 is transmitted to the driven gear 33 through the timing belt 34, the ball screw portion 26 is rotated, and the ball nut portion 27 is moved forward/moved backward. As a result, the cross head 5h, which is integral with the ball nut portion 27, is moved forward or backward, the toggle link mechanism 5 is bent or expanded, and the movable platen 13 is moved forward or moved backward to a mold opening direction (backward direction) or a mold closing direction (forward direction).

On the other hand, a mold thickness adjusting device 1 is attached to the pressure receiving platen 3. The mold thickness adjusting device 1 includes screw mechanisms 38, . . . in which screw portions 36, . . . formed at rear end sides of the four tie bars 22, . . . and adjusting nuts 37, . . . are screwed with the screw portions 36, . . . , respectively. In this case, the adjusting nuts 37, . . . also function as stoppers for the pressure receiving platen 3. As a result, by rotating the adjusting nuts 37, . . . , they are relatively displaced with respect to the screw portions 36, . . . , and the pressure receiving platen 3 can be moved forward or backward.

Moreover, on the side face of the pressure receiving platen 3, a geared motor 2s constituting the mold thickness adjusting motor 2 to become a driving source for moving the pressure receiving platen 3 is attached. The geared motor 2s includes a motor main body portion 41, and the motor main body portion 41 includes a motor portion by an induction motor disposed on a second half portion and a reduction gear mechanism to which rotation of the motor portion is inputted by being disposed on a first half portion, and an output shaft 42 that outputs rotation of the reduction gear mechanism protrudes from the front end face of the motor main body portion 41. From the rear end face of the motor main body portion 41, on the other hand, a motor shaft in the motor portion protrudes, and a motor brake portion 43 that locks or unlocks the position and a rotary encoder 2e that detects a rotation number of the motor shaft are attached to the motor shaft. By using the geared motor 2s incorporating the reduction gear mechanism for the mold thickness adjusting motor 2 as above, by performing the method of adjusting a mold thickness according to this embodiment, greater performances can be obtained from the viewpoints of the entire size reduction, energy saving, and cost cut.

Also, the rotary encoder 2e can detect an absolute position by the occurrence number of an encoder pulse at a reference position using the incremental encoder. An absolute type that detects an absolute position may be used for the rotary encoder 2e. The rotary encoder 2e and the motor brake portion 43 configured as above have an advantage that contribution can be made to the entire size reduction similarly to the servo motor attached with an encoder since they are integrally assembled to the motor main body portion 41. Moreover, for the mold thickness adjusting motor 2, the open-loop control is executed by a molding machine controller 61, which will be described later. Therefore, the position control to the target position is executed by the open-loop control, and when the target position is reached, control is made to stop the mold thickness adjusting motor 2. By configuring the above control system, the control system relating to the mold thickness adjustment including the mold thickness adjusting motor 2 can be simplified, and contribution can be made to further size reduction and cost cut, which is an advantage.

Figure 4:
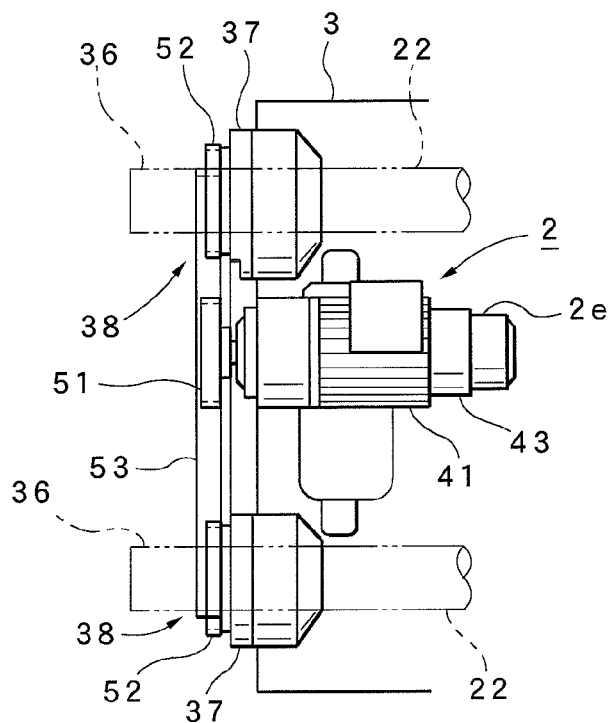
FIG. 4 is a side configuration diagram illustrating an essential part of a mold thickness adjusting device disposed in the toggle-type mold clamping device.
Figure 5:
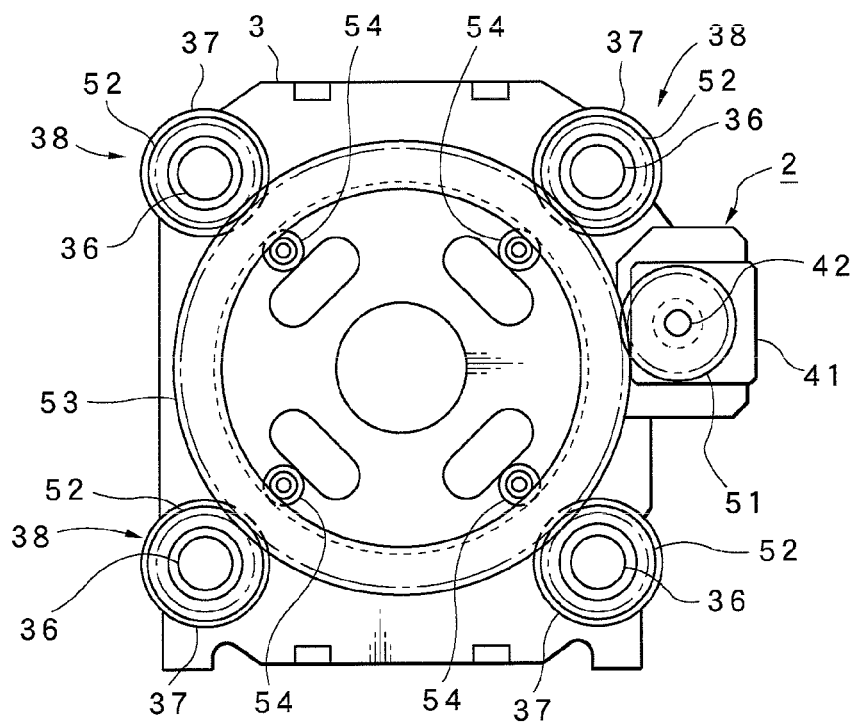
FIG. 5 is a rear configuration diagram illustrating the essential part of the mold thickness adjusting device.

On the other hand, as shown in FIGS. 4 and 5, a driving gear 51 is attached to the front end side of the output shaft 42, and small gears 52, . . . are integrally attached to each of the adjusting nuts 37, . . . , respectively. In this case, each of the adjusting nuts 37, . . . and the small gears 52, . . . are located coaxially, respectively. Also, a large gear 53 meshed with each of the small gears 52, . . . and the driving gear 51 is disposed. The large gear 53 is formed in a ring shape, and a rail portion disposed along an inner peripheral face is supported by four supporting rollers 54, . . . attached to the pressure receiving platen 3. That is, each of the small gears 52, . . . is disposed at each of four corner positions of a square, and the large gear 53 is disposed at a position surrounded by the small gears 52, . . . , and thus, each of the small gears 52, . . . is meshed with the large gear 53 at the same time.

Therefore, by operating the mold thickness adjusting motor 2 (geared motor 2s), the large gear 53 is rotated by rotation of the driving gear 51, and each of the small gears 52, . . . is rotated at the same time by the rotation of the large gear 53. Since each of the adjusting nuts 37, . . . rotated integrally with each of the small gears 52, . . . is moved forward/moved backward along the screw portions 36, . . . of the tie bars 22, . . . , the pressure receiving platen 3 is also moved forward/backward, and its position in the front-and-rear direction is adjusted. Reference numeral 61 denotes a molding machine controller, to which the mold clamping motor 4, the rotary encoder 4e, the mold thickness adjusting motor 2, the motor brake portion 43, and the rotary encoder 2e are connected.

Subsequently, the method of adjusting a mold thickness according to this embodiment using the mold thickness adjusting device 1 as above will be specifically described referring to FIGS. 1 to 7.

Figure 1:
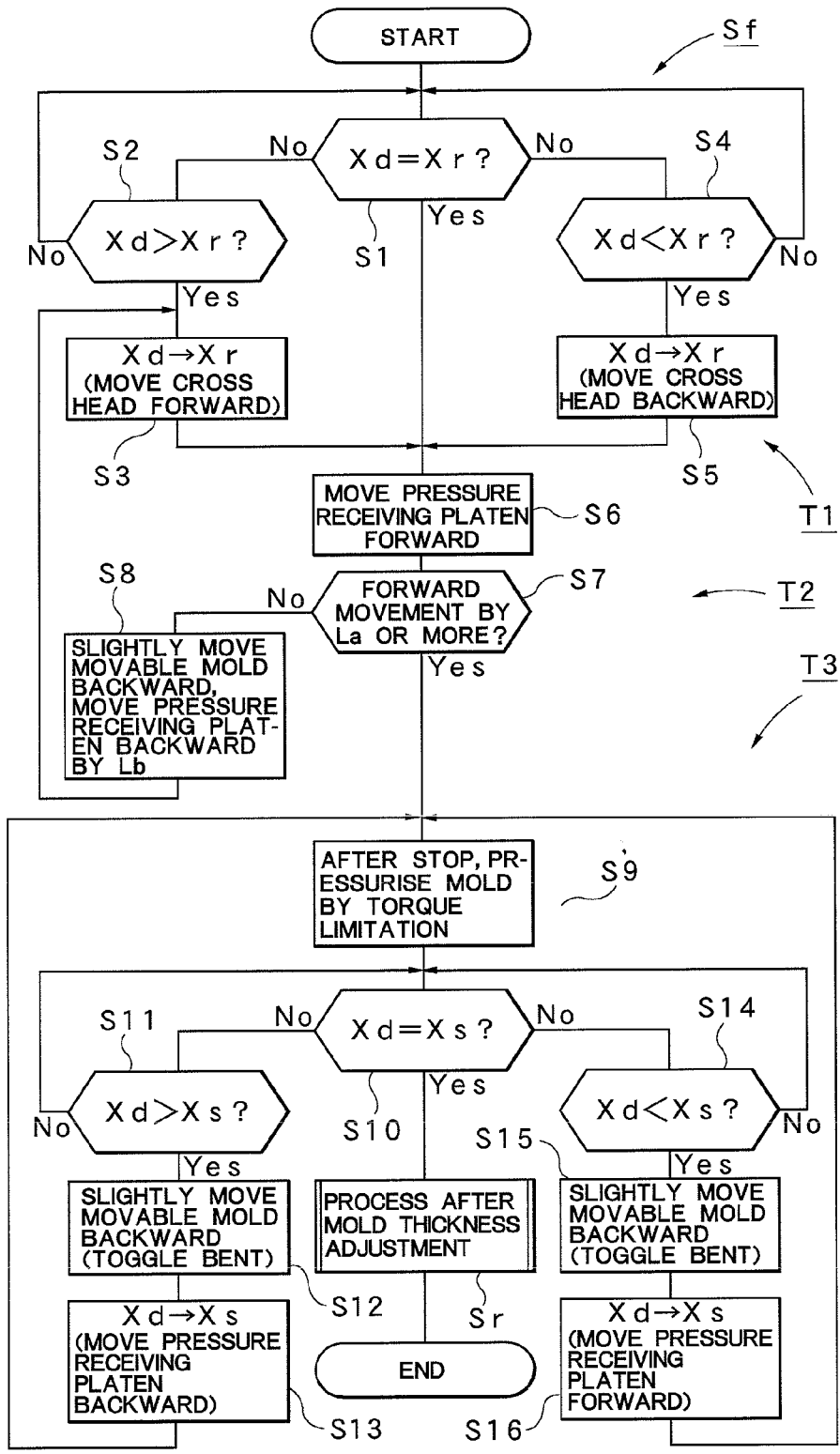
FIG. 1 is a flowchart illustrating a processing procedure in a first half of a method of adjusting a mold thickness according to a preferred embodiment of the present invention.
Figure 2:
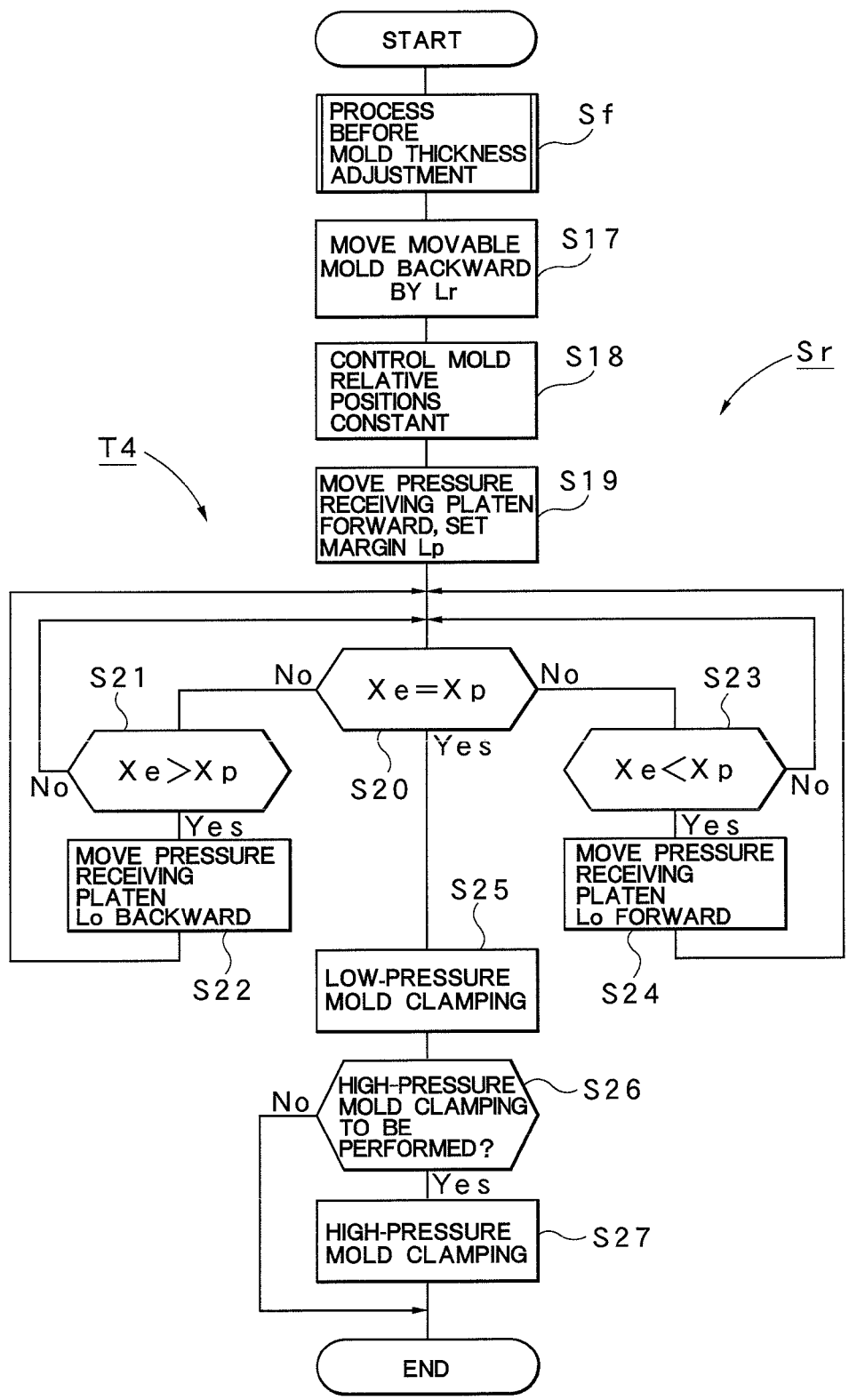
FIG. 2 is a flowchart illustrating a processing procedure in a second half of the method of adjusting a mold thickness.

FIGS. 1 and 2 are flowcharts illustrating processing procedures of the method of adjusting a mold thickness, in which FIG. 1 shows a process Sf before mold thickness adjustment and FIG. 2 shows a process Sr after the mold thickness adjustment. The mold thickness adjustment is usually performed when the mold C is replaced, and a series of operations and processing based on the mold thickness adjusting method are performed automatically. Therefore, a sequence program for executing the method of adjusting a mold thickness is stored in the molding machine controller 61, operations of the mold clamping motor 4, the mold thickness adjusting motor 2 and the like are sequence-controlled according to the sequence program and various types of processing are executed. In the molding machine controller 61, various set values such as a preliminary position Xr or the like are set, but each of the set values will be described in a specific processing procedure, which will be described below.

First, the process Sf before the mold thickness adjustment will be described according to the flowchart shown in FIG. 1. First, the first process T1 in which the mold clamping motor 4 is driven-controlled so as to move the cross head 5h of the toggle link mechanism 5 to the preliminary position Xr set in advance so as to be a position on the mold open side rather than a mold closure position Xs is performed. In this case, the mold closure position Xs is a normal mold thickness reading position before a clamping margin Lp, which will be described later, is set.

In the first process T1, upon start of the process, the molding machine controller 61 detects the position of the cross head 5h in the toggle link mechanism 5 by the occurrence number of the encoder pulse obtained from the rotary encoder 4e attached to the mold clamping motor 4 (servo motor 4s) as an absolute position. As a result, a detected position Xd is obtained. Therefore, in the molding machine controller 61, a preliminary position Xr to become a position on the mold open side rather than the mold closure position Xs is set in advance. In this case, the mold closure position Xs is usually at the position of the cross head 5h when the toggle link mechanism 5 is expanded to the full or a position slightly in front of this position, and thus, the preliminary position Xr is preferably set at a position separated by approximately 5 to 15 [mm] from the mold closure position Xs to the mold opening direction.

Figure 6A:
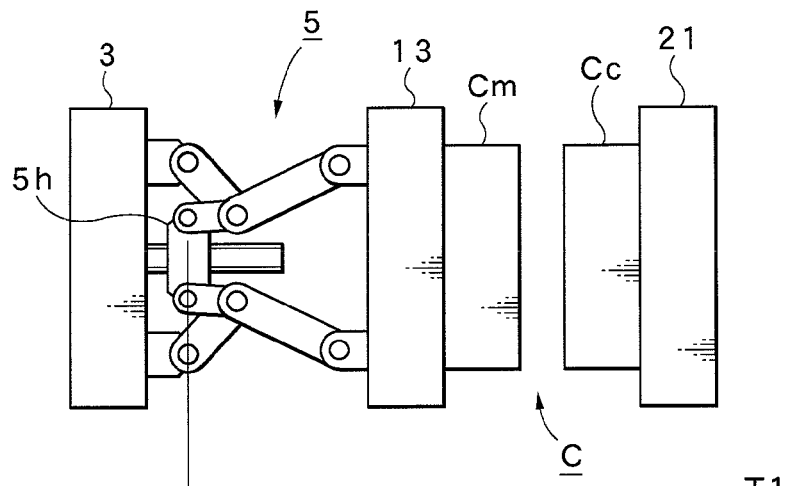
FIG. 6(a) is a process explanatory diagram illustrating an initial state in a first process when mold thickness adjustment is performed by the method of adjusting a mold thickness.
Figure 6B:
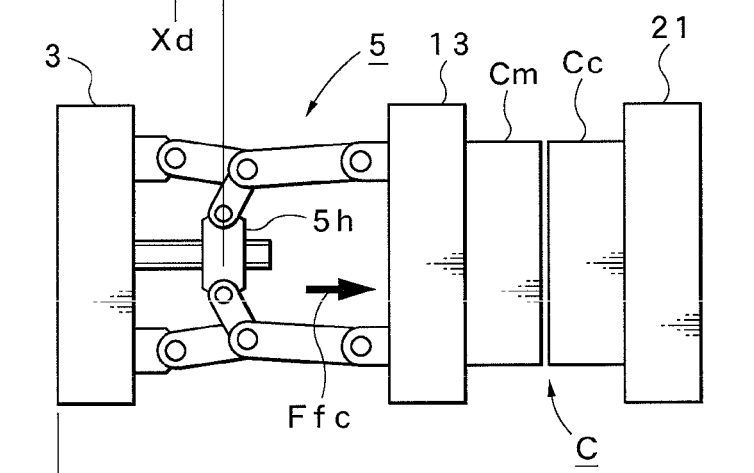
FIG. 6(b) is a process explanatory diagram illustrating a state in which a cross head has been moved forward in the first process when mold thickness adjustment is performed by the method of adjusting a mold thickness.

It is not known yet at what position on the mold open side or the mold closed side the cross head 5h in the initial stage is located, and the molding machine controller 61 first compares the detected position Xd with the preliminary position Xr and determines the position of the cross head 5h (Step S1). At this time, if the detected position Xd matches the preliminary position Xr, that is, in a state of Xd=Xr, there is no need to move the cross head 5h, but if the detected position Xd is larger than the preliminary position Xr, that is, if the detected position Xd is on the mold open side rather than the preliminary position Xr and in a state of Xd>Xr, the toggle link mechanism 5 is in a further bent state, and the mold clamping motor 4 is driven-controlled so as to move the cross head 5h forward and to match the detected position Xd with the preliminary position Xr (Steps S2, S3). FIGS. 6(a) and 6(b) show a state in the first process T1. FIG. 6(a) shows the initial state in which the detected position Xd is on the mold open side rather than the preliminary position Xr. Therefore, first, the position of the cross head 5h in this state is detected as the detected position Xd. FIG. 6(b) shows a state in which by expanding the toggle link mechanism 5, the cross head 5h is moved forward, that is, moved to an arrow Ffc direction in the figure, and the detected position Xd is matched with the preliminary position Xr.

On the other hand, when the detected position Xd and the preliminary position Xr are compared in the first place, if the detected position Xd is smaller than the preliminary position Xr, that is, if the detected position Xd is on the mold closed side rather than the preliminary position Xr and in the state of Xd<Xr, the toggle link mechanism 5 is in the further expanded state, and thus, the mold clamping motor 4 is driven-controlled, and the cross head 5*h* is moved backward so that the detected position Xd is matched with the preliminary position Xr (Steps S4 and S5).

If the cross head 5*h* cannot be moved to the preliminary position Xr even by the driving control of the mold clamping motor 4, the mold thickness adjusting motor 2 is driven-controlled as necessary, and the pressure receiving platen 3 is moved backward or moved forward so that the toggle link mechanism 5 is expanded or bent until the detected position Xd is matched with the preliminary position Xr. As mentioned above, if the cross head 5*h* cannot be moved to the preliminary position Xr even by the driving control of the mold clamping motor 4, by moving the pressure receiving platen 3 by the mold thickness adjusting motor 2, the cross head 5*h* can be reliably moved to the preliminary position Xr, and thus, automation of the mold thickness adjustment can be realized easily and reliably. Then, if the detected position Xd and the preliminary position Xr match each other and in the state of Xd=Xr, finally, the first process T1 is finished.

When the first process T1 is finished, the second process T2 in which the mold thickness adjusting motor 2 is driven-controlled and the pressure receiving platen 3 is moved forward to a mold closed position Xc where the mold C is closed is executed. In this embodiment, the position where the mold C is closed by driving control of the mold thickness adjusting motor 2 is referred to as the mold closed position Xc, and a position where the mold C is closed by driving control of the mold clamping motor 4 is referred to as the mold closure position Xs, respectively.

Figure 6C:
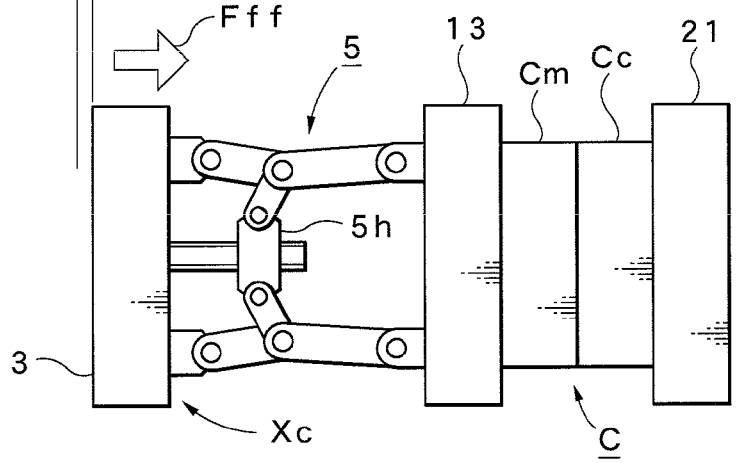
FIG. 6(c) is a process explanatory diagram illustrating a state in a second process when mold thickness adjustment is performed by the method of adjusting a mold thickness.
Figure 7:
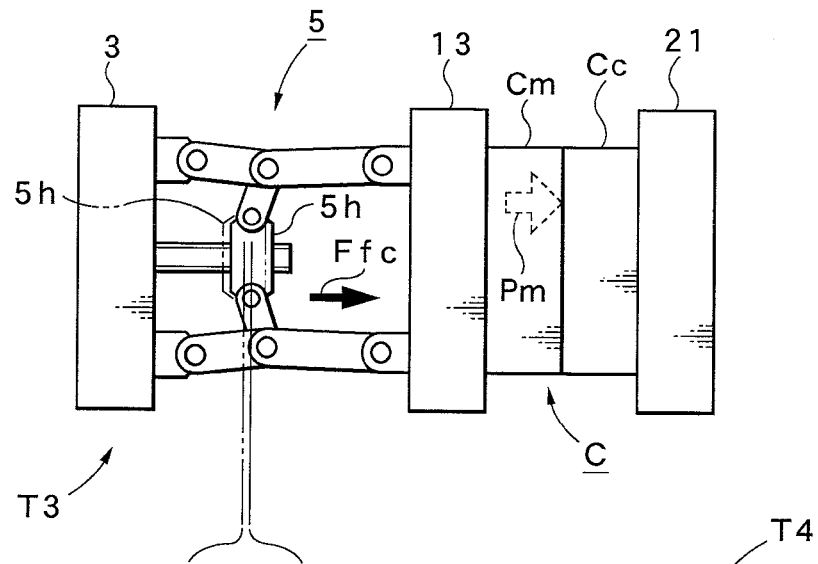
FIG. 7(a) is a process explanatory diagram illustrating a state in a third process when mold thickness adjustment is performed by the method of adjusting a mold thickness.
FIG. 7(b) is a process explanatory diagram illustrating a state in which the cross head has been moved backward in a fourth process when mold thickness adjustment is performed by the method of adjusting a mold thickness.
FIG. 7(c) is a process explanatory diagram illustrating a state in which the pressure receiving platen has been moved forward in the fourth process when mold thickness adjustment is performed by the method of adjusting a mold thickness.
Figure 7:
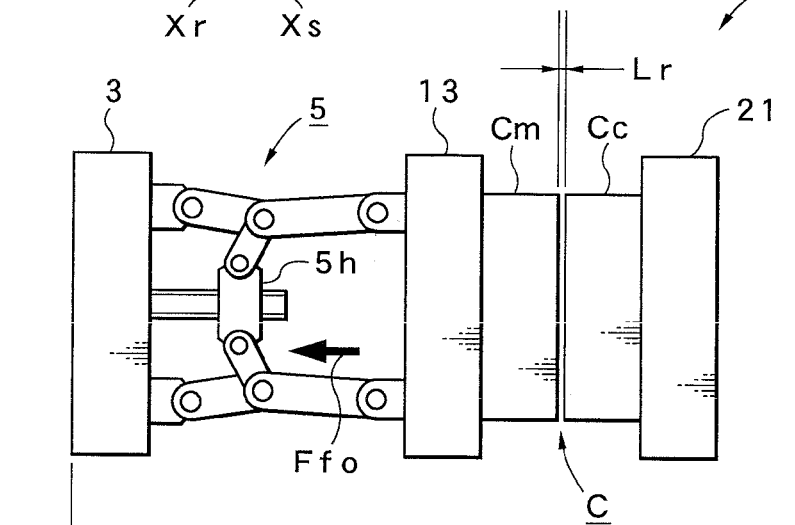
Figure 7:
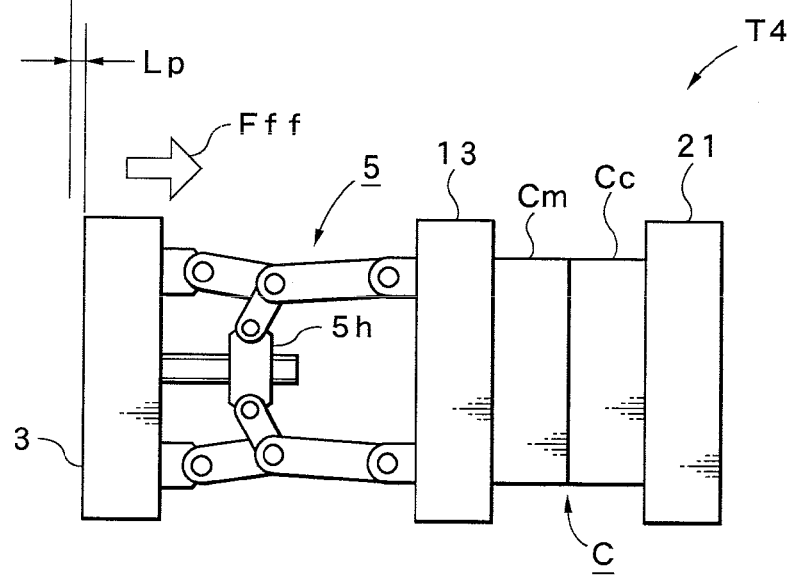

In the second process T2, the mold thickness adjusting motor 2 is driven-controlled and the pressure receiving platen 3 is moved forward (Step S6). At this time, if the pressure receiving platen 3 is moved forward by a distance La [mm] or more set in advance, it is continuously moved forward until the movable mold Cm is brought into contact with the fixed mold Cc and stopped (Step S7). In this case, the stop position becomes the mold closed position Xc, and at the stop position, an operation of the mold thickness adjusting motor 2 is stop-controlled. The distance La [mm] is preferably selected around 1 [mm]. FIG. 6(*c*) shows a state of the second process T2 and shows a state in which after completion of the first process T1, the pressure receiving platen 3 is moved forward by La [mm] or more in an arrow Fff direction and stopped at the mold closed position Xc where the movable mold Cm is brought into contact with the fixed mold Cc.

On the other hand, when the pressure receiving platen 3 is moved forward, if the movable mold Cm is brought into contact with the fixed mold Cc before reaching La [mm] and stopped, the following control is executed. That is, in this case, if stopped, the mold clamping motor 4 is driven-controlled so as to slightly move the movable mold Cm backward and after that, the mold thickness adjusting motor 2 is driven-controlled so as to move the pressure receiving platen 3 backward by Lb [mm] set in advance (Steps S7 and S8). Lb [mm] is preferably selected around several [mm]. Also, a speed when the mold thickness adjusting motor 2 is driven-controlled so as to move the pressure receiving platen 3 backward is preferably set higher than a speed at which the pressure receiving platen 3 is moved forward so as to reduce the overall time of the mold thickness adjustment. Then, the mold clamping motor 4 is driven-controlled again so as to expand the toggle link mechanism 5, and the cross head 5*h* is moved forward until the detected position Xd matches the preliminary position Xr (Steps S2 and S3). The reason why the pressure receiving platen 3 is moved backward by Lb [mm] is to avoid an adverse effect that the mold clamping force is unnecessarily increased by a backlash or deflection of the mechanism or the like if the forward movement of the pressure receiving platen 3 is less than La [mm]. By the above processing, if the movable mold Cm is brought into contact with the fixed mold Cc and stopped at the mold closed position Xc, the second process T2 is finished.

If the second process T2 is finished, the third process T3 is performed in which the mold clamping motor 4 is driven-controlled so as to move the cross head 5*h* forward, while the torque limitation of the mold clamping motor 4 is performed so as to pressurize the mold C, and the mold thickness adjusting motor 2 is driven-controlled so as to move the pressure receiving platen 3 and the cross head 5*h* is moved to the mold closure position Xs.

In the third process T3, first, the mold clamping motor 4 is driven-controlled so as to expand the toggle link mechanism 5, and if the movable mold Cm is brought into contact with the fixed mold Cm, the torque limitation of the mold clamping motor 4 is performed so as to pressurize the mold C (Step S9). Therefore, in the molding machine controller 61, a degree of the torque limitation is set in advance. Specifically, it is preferably set such that the limited torque is 3 to 20[%] of that in the high-pressure mold clamping. As a result, unnecessary application of an excessive pressure to the mold C can be avoided, and at the same time, an error factor in the mold thickness adjustment for the special mold in which a spring is interposed between the fixed mold and the movable mold or the mold in which a machine error in the mounting can be easily generated due to the mold structure and parallelism between the fixed mold and the movable mold cannot be ensured easily, for example, can be effectively eliminated.

Then, in this state, the molding machine controller 61 detects the position of the cross head 5*h* by the occurrence number of the encoder pulse obtained from the rotary encoder 4*e* as an absolute position. As a result, the detected position Xd can be obtained. On the other hand, since the mold closure position Xs is set in the molding machine controller 61, the molding machine controller 61 determines if the detected position Xd of the cross head 5*h* in the state in which the mold clamping motor 4 is torque-limited matches the mold closure position Xs or not (Step S10). At this time, if the detected position Xd matches the mold closure position Xs and in the state of Xd=Xs, the pressure receiving platen 3 has been adjusted to the targeted mold thickness reading position.

On the other hand, if the detected position Xd is larger than the mold closure position Xs, that is in the state of Xd>Xs, the toggle link mechanism 5 is in the further bent state, and thus, the pressure receiving platen 3 needs to be moved backward. Therefore, in this case, after the mold clamping motor 4 is driven-controlled so as to slightly move the movable mold Cm backward, the mold thickness adjusting motor 2 is driven-controlled, and the pressure receiving platen 3 is moved backward until the detected position Xd matches the mold closure position Xs (Steps S11, S12, and S13). The distance to be moved backward may be a distance obtained by considering a deviation between the detected position Xd and the mold closure position Xs or may be a certain distance set in advance. If the certain distance is set, it might be repeated several times. The speed at which the pressure receiving platen 3 is moved backward by drive control of the mold thickness adjusting motor 2 is preferably set higher than the speed at which the pressure receiving platen 3 is moved forward so as to reduce the overall time of the mold thickness adjustment.

On the other hand, if the detected position Xd is smaller than the mold closure position Xs, that is, in the state of Xd<Xs, the toggle link mechanism 5 is in the further expanded state, and the pressure receiving platen 3 needs to be moved forward. Therefore, in this case, the mold clamping motor 4 is driven-controlled so as to slightly move the movable mold Cm backward and then, the mold thickness adjusting motor 2 is driven-controlled and the pressure receiving platen 3 is moved forward until the detected position Xd matches the mold closure position Xs (Steps S14, S15, and S16). FIG. 7(a) shows a state of the third process T3 and shows a state in which after the second process T2 is finished, the cross head 5h is slightly moved forward to the arrow Ffc direction, while the position of the cross head 5h (detected position Xd) is moved to the mold closure position Xs, and the mold C is pressurized by a pressurizing force Pm generated by the torque-limited mold clamping motor 4.

In this case, the mold closure position Xs is preferably set by a predetermined allowable range Xs±zs. Therefore, the range of Xs±zs is set as the substantial mold closure position Xs. By setting as above, rapid movement to the target position can be realized, and there are advantages of time reduction for the mold thickness adjustment and contribution to stability.

As mentioned above, the processes described according to the flowchart in FIG. 1 constitute the process Sf before the mold thickness adjustment. Subsequently, the process Sr after the mold thickness adjustment is performed. The process Sr after the mold thickness adjustment will be described according to the flowchart shown in FIG. 2. When the third process T3 is finished, the fourth process T4 in which the clamping margin Lp of the mold C is set corresponding to the predetermined mold clamping force is performed.

In the fourth process T4, first, the mold clamping motor 4 is driven-controlled so as to move the cross head 5h backward, by which the movable mold Cm is moved backward only by a predetermined distance Lr and slight mold opening is performed (Step S17). In this case, the distance Lr is a distance for setting the clamping margin Lp, which will be described later, and a distance that can ensure at least the clamping margin Lp is selected. The distance Lr is preferably set around 5 [mm]. Then, the clamping margin Lp is set. Therefore, in the molding machine controller 61, the clamping margin Lp that generates a target mold clamping force is set in advance. In setting of the clamping margin Lp, by driving control of the mold thickness adjusting motor 2, the pressure receiving platen 3 is moved forward only by the set clamping margin Lp. At this time, by driving control of the mold thickness adjusting motor 2, the pressure receiving platen 3 is moved forward, and by driving control of the mold clamping motor 4, the movable platen 13 is moved backward at the same time so that the relative positions of the movable mold Cm and the fixed mold Cc in the mold C are controlled constant. As a result, safety can be further improved such that drop of the mold C can be prevented or the like. When a clamping margin set position Xp corresponding to the clamping margin Lp is reached, control to stop the operation of the mold thickness adjusting motor 2 is executed (Steps S18 and S19). FIGS. 7(b) and 7(c) show a state of the fourth process T4, in which FIG. 7(b) shows a state in which the cross head 5h is moved backward in an arrow Ffo direction and moreover, the movable mold Cm is moved backward only by the predetermined distance Lr, while FIG. 7(c) shows a state in which the clamping margin Lp is set by advancing the pressure receiving platen 3 in the arrow Fff direction.

As mentioned above, an error factor in the mold thickness adjustment caused by a special mold in which a spring is interposed between a fixed mold and a movable mold or a mold in which a machine error in mounting can easily occur due to a mold structure and parallelism between the fixed mold and the movable mold cannot be easily ensured, for example, was effectively eliminated in the third process T3. Therefore, in the fourth process T4, basic clamping margin setting processing is sufficient, and as mentioned above, the mold clamping motor 4 is driven-controlled so as to move the movable platen 13 only by the predetermined distance Lr and then, the mold thickness adjusting motor 2 is driven-controlled so as to move the pressure receiving platen 3 only by the clamping margin Lp set in advance, and the target clamping margin Lp can be set easily and reliably.

In setting of the clamping margin Lp, since the position control for the mold thickness adjusting motor 2 is executed by the open-loop control, in the case in which the mold C with a large weight is attached or the like, for example, inertia becomes larger when the pressure receiving platen 3 is moved forward, and there might be a case in which the platen does not stop accurately at the clamping margin set position Xp set corresponding to the clamping margin Lp. Thus, in the molding machine controller 61, such control is executed that the position of the pressure receiving platen 3 (movable mold Cm) is detected by the occurrence number of the encoder pulse obtained from the rotary encoder 2e attached to the mold thickness adjusting motor 2 and the mold is accurately stopped at the clamping margin set position Xp.

First, an actual detected position Xe is obtained from the rotary encoder 2e, and the molding machine controller 61 compares the detected position Xe with the clamping margin set position Xp (Step S20). In this case, the clamping margin set position Xp is set by a predetermined allowable range Xp±zp. Therefore, the range of Xp±zp becomes the substantial margin set position Xp. By making such settings, rapid movement to the target position becomes possible, and there is an advantage that contribution can be made to reduction of time for the mold thickness adjustment and stability.

If it is Xe=Xp at this time, there is no need to additionally move the pressure receiving platen 3, but if the detected position Xe is larger than the clamping margin set position Xp, that is, in the state of Xe>Xp, the pressure receiving platen 3 has been moved forward too much, and it is moved backward only by a certain distance Lo set in advance, and then, processing to compare the detected position Xe and the clamping margin set position Xp is performed again and is repeated until Xe=Xp is obtained (Steps S21, S22, S20, . . . ). On the other hand, in the state of Xe<Xp, the forward movement of the pressure receiving platen 3 is not enough, and the platen is moved forward only by the certain distance Lo, and processing to compare the detected position Xe and the clamping margin set position Xp is made again after that and repeated until Xe=Xp is obtained (Steps S23, S24, S20, . . . ). Therefore, the operation of backward (or forward) movement only by the certain distance Lo might be performed repeatedly in the backward direction (or in the forward direction) or the operations in the backward direction and the forward direction might be performed alternately. By executing such processing, even if the position control is made by the open-loop control, positional accuracy in the case in which the mold C with a large weight whose inertia becomes large in the adjustment (movement) is attached or the like can be ensured, and there is an advantage that contribution can be made to a higher quality and a higher accuracy of a molded product. The speed at which the pressure receiving platen 3 is moved backward is set higher than the speed at which the pressure receiving platen 3 is moved forward. As a result, accurate position control at a low speed is made possible in the forward movement in the position control, while if forward movement is made too much, rapid return by the backward movement at a high speed is made possible, and there is an advantage that the overall time can be reduced in the position control.

When Xe=Xp is obtained, the setting of the clamping margin Lp is finished. After that, the molding machine controller 61 executes drive-control of the mold clamping motor 4 and performs low-speed mold clamping by expanding the toggle link mechanism 5 (Step S25). Moreover, in the case of high-pressure mold clamping, the high-pressure mold clamping is performed by drive-control of the mold clamping motor 4 (Steps S26 and S27). As a result, the mold thickness adjustment processing on the basis of the method of adjusting a mold thickness according to this embodiment is finished.

Therefore, according to the method of adjusting a mold thickness according to this embodiment, since the mold is closed by using a driving force of the mold clamping system including the mold clamping motor 4 and the toggle link mechanism 5 in the mold thickness adjustment, even if a relatively small-sized motor with a small power is used for the mold thickness adjusting motor 2, an error factor in the mold thickness adjustment caused by a special mold in which a spring is interposed between a fixed mold and a movable mold or a mold in which a machine error in mounting can easily occur due to a mold structure and parallelism between the fixed mold and the movable mold cannot be easily ensured, for example, can be eliminated, and the mold thickness adjustment with high accuracy can be made also for the mold C in various structures including the special mold or the mold C in the various states. Also, since the error factor in the mold thickness adjustment is eliminated by closing the mold by using the driving force of the mold clamping system, as a result, further size reduction, energy saving and cost cut in the mold thickness adjusting motor 2 can be realized. Particularly, as in this embodiment, by using the geared motor 2s incorporating the reduction gear mechanism for the mold thickness adjusting motor 2, greater performances can be obtained from the viewpoints of promoting size reduction, energy saving, and cost cut.

The preferred embodiments have been described in detail as above, but the present invention is not limited by these embodiments but arbitrary changes, additions or deletion are possible within a range not departing from the sprint of the present invention in terms of the configuration, shapes, materials, quantities, numeral values, methods (procedures) and the like of details.

For example, the case in which the geared motor 2s incorporating the reduction gear mechanism is used as the mold thickness adjusting motor 2 was shown, but it may be a combination of a reduction gear mechanism and a driving motor configured separately. Regardless of operation principles of the mold thickness adjusting motor 2 and the mold clamping motor 4, known various types of motors can be used. The first process T1 to the fourth process T4 and the process Sf before the mold thickness adjustment and the process Sr after the mold thickness adjustment are given for convenience in order to facilitate understanding, and the classification is not binding at all. In the meantime, the torque limitation of the mold clamping motor 4 is preferably made at 3 to 20[%] of that in the high-pressure mold clamping, but the cases of less than 3[%] or exceeding 20[%] are not excluded. Also, the case in which the predetermined allowable range of Xs±zs is set to the mold closure position Xs and the predetermined allowable range of Xp±zp is set to the clamping margin set position Xp was shown, but the allowable ranges are not necessarily required to be set. Moreover, the case in which the position of the pressure receiving platen 3 is detected by the rotary encoder 2e attached to the mold thickness adjusting motor 2, and the position of the cross head 5h is detected by the rotary encoder 4e attached to the mold clamping motor 4 (servo motor 4s) was shown, but a case of detection by position detecting means disposed at other positions on the basis of other detection principles is not excluded. On the other hand, the case in which the speed at which the pressure receiving platen 3 is moved backward is set higher than the speed at which the pressure receiving platen 3 is moved forward was shown, but this setting may be applied to all the corresponding operations or may be applied to only some of the operations as necessary. Similarly, the case in which when the pressure receiving platen 3 is moved forward or moved backward by drive control of the mold thickness adjusting motor 2, the mold clamping motor 4 is driven-controlled at the same time so as to move the movable mold in the mold C backward or forward and the relative positions of the movable mold and the fixed mold in the mold C are controlled to be constant was shown, but this control may be applied to all the corresponding operations or may be applied to some of the operations as necessary.

INDUSTRIAL APPLICABILITY

The method of adjusting a mold thickness according to the present invention can be used for various types of toggle-type mold clamping device provided with a mold thickness adjusting device that adjusts a mold thickness by moving a pressure receiving platen to a predetermined position through driving control of a mold thickness adjusting motor. Therefore, the toggle-type mold clamping device itself may be an electric mold clamping device or a hydraulic mold clamping device. Also, the toggle-type mold clamping device can be applied to any toggle-type mold clamping device disposed in various types of molding machine including the exemplified injection molding machine.

REFERENCE SIGNS LIST

2: Mold thickness adjusting motor, 2s: Geared motor, 2e: Rotary encoder, 3: Pressure receiving platen, 4: Mold clamping motor, 5: Toggle link mechanism, 5h: Cross head, 13: Movable platen, Xs: Mold closure position, Xr: Preliminary position, Xc: Mold closed position, Xp: Clamping margin set position, T1: First process, T2: Second process, T3: Third process, T4: Fourth process, C: Mold, Lp: Clamping margin, Lr: Predetermined distance, Mc: Toggle-type mold clamping device

CITATION LIST

Patent Literature 1
JP2007-98832

The invention claimed is:

1. A method of adjusting a mold thickness of a toggle-type mold clamping device in which a pressure receiving platen is moved to a predetermined position by a driving control of a mold thickness adjusting motor so as to make mold thickness adjustment, comprising:

a first process in which a cross head of a toggle link mechanism is moved to a preliminary position set in advance so as to become a position on a mold open side rather than a mold closure position by the driving control of a mold clamping motor;

a second process in which after the first process is finished, said pressure receiving platen is moved forward to the mold closure position where a mold is closed by the driving control of said mold thickness adjusting motor;

a third process in which after the second process is finished, said cross head is moved forward by the driving control of said mold clamping motor and said mold is pressurized by performing torque limitation of the mold clamping motor, while said mold thickness adjusting motor is driven-controlled based upon a measured position of said cross head in relation to the mold closed position so as to move said pressure receiving platen in a forward direction or a backward direction, and said cross head is moved to said mold closure position; and a fourth process in which after the third process is finished, a clamping margin of the mold corresponding to a predetermined mold clamping force is set.

2. The method of adjusting a mold thickness of a toggle-type mold clamping device according to claim 1,
wherein a geared motor incorporating a reduction gear mechanism is used for said mold thickness adjusting motor.

3. The method of adjusting a mold thickness of a toggle-type mold clamping device according to claim 1,
wherein the position of said pressure receiving platen moved by driving of said mold thickness adjusting motor is position-controlled by open-loop control.

4. The method of adjusting a mold thickness of a toggle-type mold clamping device according to claim 1,
wherein a speed at which said pressure receiving platen is moved backward is set higher than a speed at which the pressure receiving platen is moved forward.

5. The method of adjusting a mold thickness of a toggle-type mold clamping device according to claim 1,
wherein in said first process, upon start of the process, a molding machine controller detects the position of the cross head in the toggle link mechanism as an absolute position by an occurrence number of an encoder pulse obtained from a rotary encoder attached to the mold clamping motor.

6. The method of adjusting a mold thickness of a toggle-type mold clamping device according to claim 1,
wherein said preliminary position is set at a position separated from said mold closure position to the mold open direction by 5 to 15 [mm].

7. The method of adjusting a mold thickness of a toggle-type mold clamping device according to claim 1,
wherein in said first process, if movement cannot be made to said preliminary position even through the driving control of said mold clamping motor, said pressure receiving platen is moved forward or moved backward by said mold thickness adjusting motor.

8. The method of adjusting a mold thickness of a toggle-type mold clamping device according to claim 1,
wherein in said second process, when said pressure receiving platen is moved forward, if a movable mold of said mold is brought into contact with a fixed mold and stopped before reaching a distance La set in advance, said mold clamping motor is driven-controlled so as to move said movable mold backward and thereafter, said mold thickness adjusting motor is driven-controlled so as to move said pressure receiving platen backward only by a distance Lb set in advance.

9. The method of adjusting a mold thickness of a toggle-type mold clamping device according to claim 8,
wherein in said second process, a speed at which said pressure receiving platen is moved backward is set higher than a speed at which said pressure receiving platen is moved forward.

10. The method of adjusting a mold thickness of a toggle-type mold clamping device according to claim 1,
wherein in said third process, torque limitation of said mold clamping motor is performed at 3 to 20[%] of that in high-pressure mold clamping.

11. The method of adjusting a mold thickness of a toggle-type mold clamping device according to claim 1, wherein in said fourth process, after said third process is finished, said mold clamping motor is driven-controlled so as to move said movable platen backward only by a predetermined distance and thereafter, said mold thickness adjusting motor is driven-controlled so as to move the pressure receiving platen forward only by a clamping margin set in advance.

12. The method of adjusting a mold thickness of a toggle-type mold clamping device according to claim 11,
wherein in said fourth process, the position of the pressure receiving platen is detected by a rotary encoder attached to said mold thickness adjusting motor, and said pressure receiving platen is moved forward or backward by means of driving control of said mold thickness adjusting motor until the position of said pressure receiving platen reaches a clamping margin set position corresponding to said clamping margin.

13. The method of adjusting a mold thickness of a toggle-type mold clamping device according to claim 11,
wherein when said mold thickness adjusting motor is driven-controlled so as to move said pressure receiving platen forward or backward, said mold clamping motor is driven-controlled at the same time so as to move a movable mold in said mold backward or forward and relative positions of the movable mold and a fixed mold of said mold are controlled constant.

14. The method of adjusting a mold thickness of a toggle-type mold clamping device according to claim 11,
wherein in said fourth process, a clamping margin set position corresponding to said margin is set by a predetermined allowable range.

15. The method of adjusting a mold thickness of a toggle-type mold clamping device according to claim 11,
wherein in said third process, said mold thickness adjusting motor is driven-controlled so as to move said mold backward and then said pressure receiving platen forward or backward.

16. A method of adjusting a mold thickness of a mold in a toggle-type mold clamping device, comprising the steps:
a) adjusting a position of a cross head to a first predetermined position using a mold clamping motor;
b) adjusting a position of a pressure receiving platen to a second predetermined position using a mold thickness adjusting motor;
c) further forwarding said cross head by said mold clamping motor at a predetermined limited torque so that said mold is pressurized after said steps a) and b);
d) measuring a position of said cross head after said step c); and
e) adjusting the measured position of said cross head using a combination of said mold thickness adjusting motor and said clamping motor until the measured position of said cross head is at a predetermined mold closure position.

17. The method of adjusting a mold thickness of a mold in a toggle-type mold clamping device according to claim 16 further comprising an additional step e) of establishing a predetermined clamping margin by using both said mold thickness adjusting motor and said clamping motor.

18. The method of adjusting a mold thickness of a mold in a toggle-type mold clamping device according to claim 17 wherein said step e) establishes the predetermined clamping margin by moving said cross head backward by said clamping motor and moving said pressure receiving platen forward by said mold thickness adjusting motor.

19. The method of adjusting a mold thickness of a mold in a toggle-type mold clamping device according to claim 17 wherein said step e) further adjusts the clamping margin.

* * * * *